(12) United States Patent
Suzuki et al.

(10) Patent No.: US 9,465,202 B2
(45) Date of Patent: Oct. 11, 2016

(54) WIDE ANGLE LENS AND IMAGING APPARATUS

(71) Applicant: FUJIFILM Corporation, Tokyo (JP)

(72) Inventors: Takashi Suzuki, Saitama-ken (JP); Kenichi Sato, Saitama-ken (JP); Taiga Noda, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 66 days.

(21) Appl. No.: 14/635,536

(22) Filed: Mar. 2, 2015

(65) Prior Publication Data

US 2015/0168694 A1    Jun. 18, 2015

Related U.S. Application Data

(63) Continuation of application No. PCT/JP2013/004896, filed on Aug. 19, 2013.

(30) Foreign Application Priority Data

Sep. 5, 2012 (JP) ................. 2012-194655

(51) Int. Cl.
*G02B 9/12* (2006.01)
*G02B 13/04* (2006.01)
*G02B 13/18* (2006.01)
*G02B 9/64* (2006.01)
*G02B 13/00* (2006.01)

(52) U.S. Cl.
CPC ................ *G02B 13/04* (2013.01); *G02B 9/64* (2013.01); *G02B 13/0045* (2013.01); *G02B 13/18* (2013.01)

(58) Field of Classification Search
CPC .. G02B 13/04; G02B 13/0045; G02B 13/18; G02B 9/64; G02B 9/12
See application file for complete search history.

(56) References Cited

U.S. PATENT DOCUMENTS

| | | | |
|---|---|---|---|
| 4,256,373 A | 3/1981 | Horimoto | |
| 5,315,441 A | 5/1994 | Hori et al. | |
| 6,084,719 A | 7/2000 | Sugawara et al. | |
| 6,894,847 B2 | 5/2005 | Suzuki | |
| 7,193,787 B2 | 3/2007 | Horiuchi | |
| 7,312,932 B2 | 12/2007 | Horiuchi | |
| 8,072,687 B2 * | 12/2011 | Rodriguez, Jr. | G02B 13/06 359/649 |
| 2005/0168833 A1 | 8/2005 | Horiuchi | |
| 2009/0109543 A1 | 4/2009 | Nagatoshi | |
| 2011/0235191 A1 | 9/2011 | Kawamura et al. | |

(Continued)

FOREIGN PATENT DOCUMENTS

| JP | 54-032319 | 3/1979 |
|---|---|---|
| JP | 05-188294 | 7/1993 |

(Continued)

OTHER PUBLICATIONS

German Official Action—11 2013 004 349.01—Mar. 22, 2016.

(Continued)

*Primary Examiner* — Joseph P Martinez
(74) *Attorney, Agent, or Firm* — Young & Thompson

(57) ABSTRACT

A wide angle lens consists of a negative first lens group, a positive second lens group, a stop, and a positive third lens group in order from the object side. The first lens group includes two negative meniscus lenses, each with a convex surface on the object side. The second lens group includes one pair of cemented lenses. The third lens group includes two pairs of cemented lenses and at least one aspherical surface.

15 Claims, 5 Drawing Sheets

EXAMPLE 1

(56) References Cited

U.S. PATENT DOCUMENTS

| | | |
|---|---|---|
| 2011/0317282 A1 | 12/2011 | Kimura |
| 2013/0162886 A1 | 6/2013 | Morooka et al. |

FOREIGN PATENT DOCUMENTS

| | | |
|---|---|---|
| JP | 11-142731 | 5/1999 |
| JP | 2003241088 A | 8/2003 |
| JP | 2004061677 A | 2/2004 |
| JP | 2004-219610 | 8/2004 |
| JP | 2005215518 A | 8/2005 |
| JP | 2006215257 A | 8/2006 |
| JP | 2009-104048 | 5/2009 |
| JP | 2011-209377 | 10/2011 |
| JP | 2012-027450 | 2/2012 |
| JP | 2013-125213 | 6/2013 |

OTHER PUBLICATIONS

Japanese Office Action dated Feb. 23, 2016; Application No. 2014-534168.

International Search Report, PCT/JP2013/004896, Dec. 24, 2013.

* cited by examiner

FIG.1  EXAMPLE 1
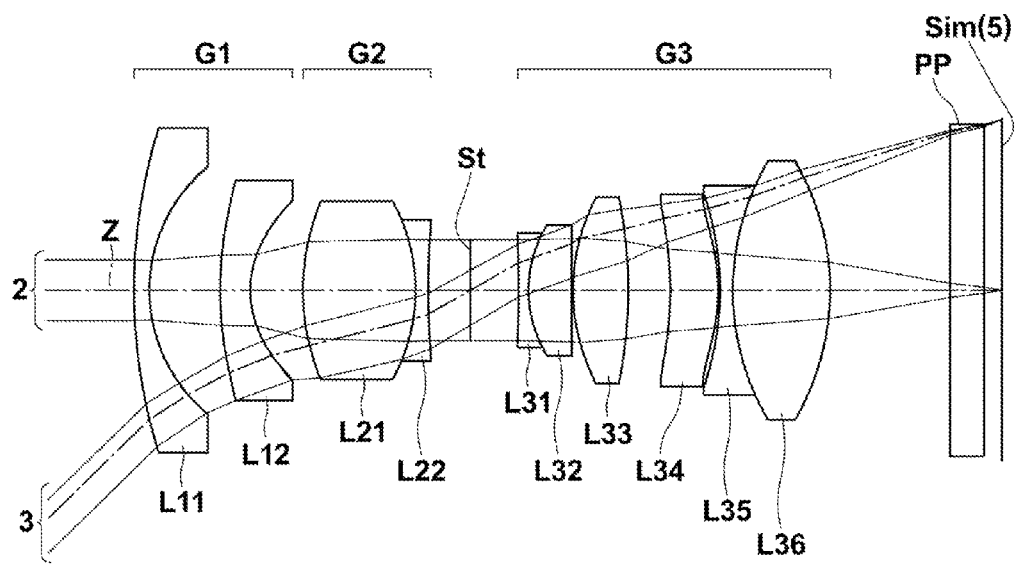
FIG.2  EXAMPLE 2
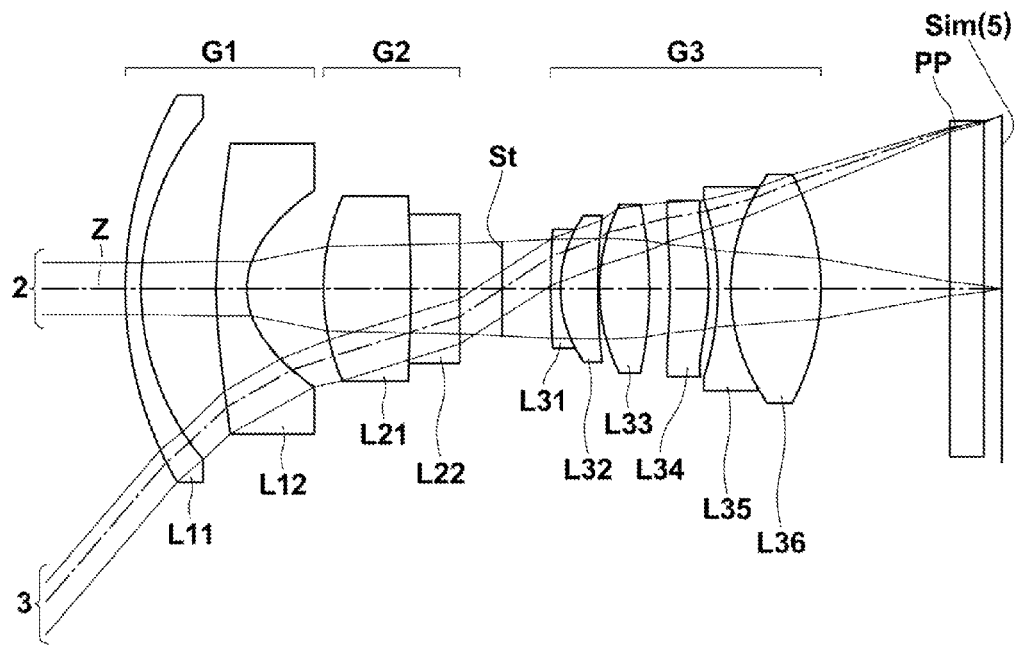

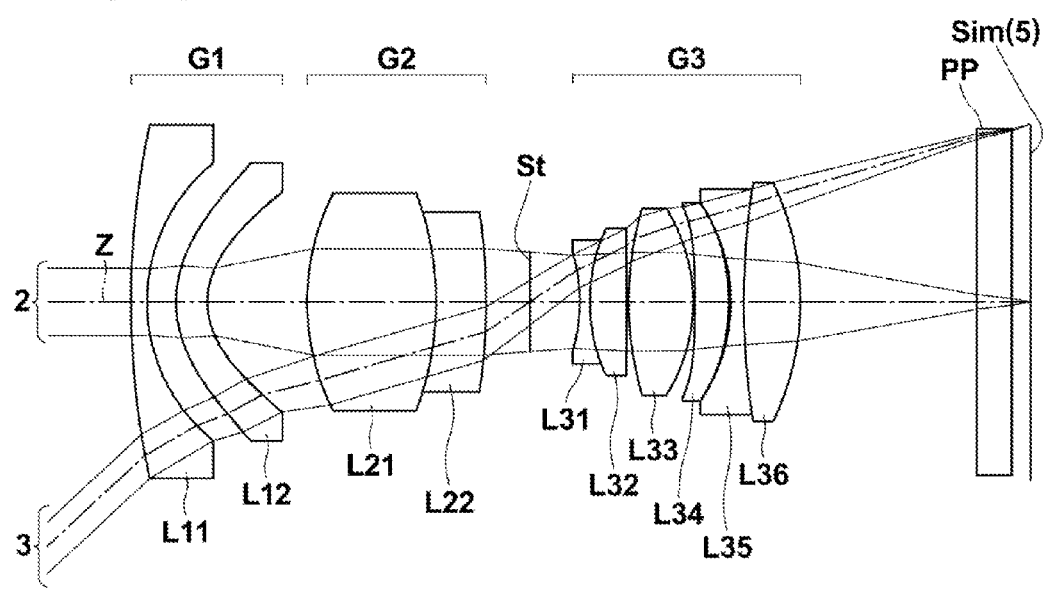
FIG.3 EXAMPLE 3
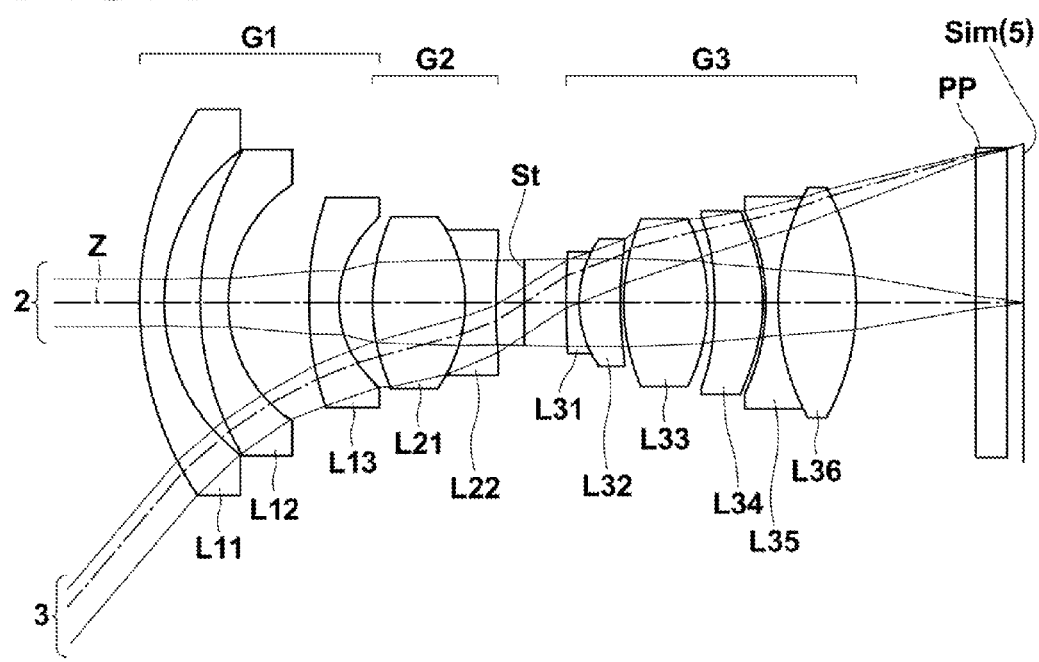
FIG.4 EXAMPLE 4

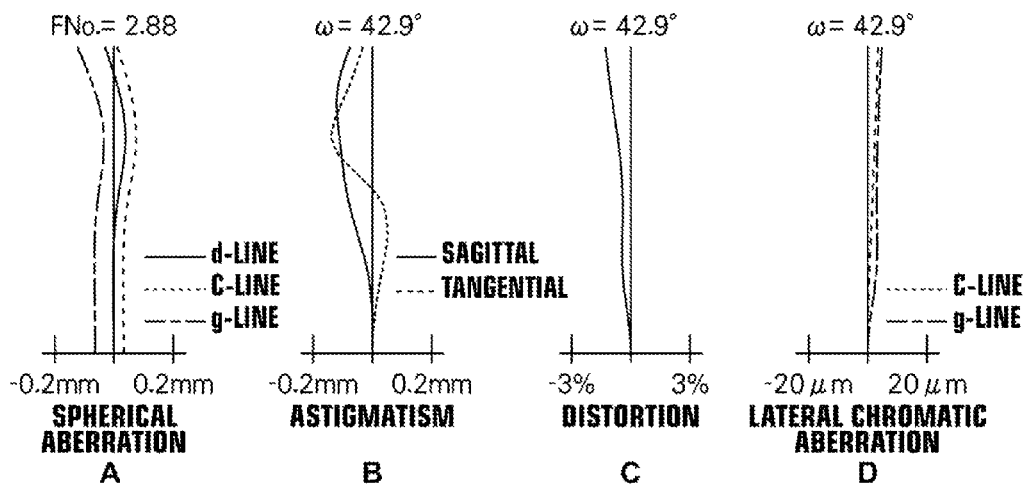
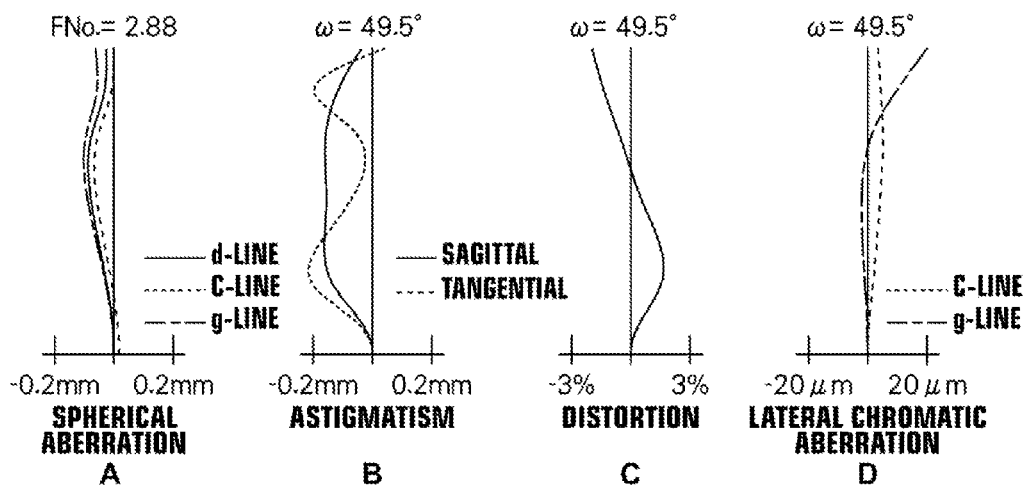

WIDE ANGLE LENS AND IMAGING APPARATUS

CROSS-REFERENCE TO RELATED APPLICATIONS

This application is a Continuation of PCT International Application No. PCT/JP2013/004896 filed on Aug. 19, 2013, which claims priority under 35 U.S.C. §119 (a) to Japanese Patent Application No. 2012-194655 filed on Sep. 5, 2012. Each of the above applications is hereby expressly incorporated by reference, in its entirety, into the present application.

BACKGROUND OF THE INVENTION

1. Technical Field

The present invention relates to a wide angle lens and an imaging apparatus, and more specifically to a wide angle lens that can be suitably used for digital cameras and the like, and an imaging apparatus equipped with the wide angle lens.

2. Background Art

Heretofore, retrofocus type lens systems have been frequently used in wide angle lenses for use with single lens reflex cameras, as it is necessary to secure a sufficient back focus. The retrofocus type lens system includes a negative lens group and a positive lens group disposed in order from the object side to form an asymmetrical configuration with respect to the stop, and has generally a long back focus. In the meantime, a so-called mirror-less camera having no mirror between the imaging lens and the image plane has recently becoming popular due to its advantages of compactness and light weight, and along with this, development of lens systems for such small cameras has been in progress. Wide angle lenses for mirror-less cameras do not require a long back focus but an angle of a light ray incident on the image plane needs to be maintained relatively small and, therefore, a negative-leading lens type is often used. The negative-leading lens systems already known may include those described, for example, in Japanese Unexamined Patent Publication No. 2004-219610 and Japanese Unexamined Patent Publication No. 2011-209377.

SUMMARY OF THE INVENTION

In order to respond to the recent demand for downsizing of cameras, in particular, the size reduction in an optical axis direction, it is desirable to reduce the overall length of the lens system. Further, in order to respond to digital cameras that have been widely used in recent years, favorable lateral chromatic aberration correction is required and the requirement level has been raised in recent years along with increased pixel counts. The conventional retrofocus type wide angle lens systems for single-lens reflex cameras tend to be upsized due to a long back focus and satisfactory correction of lateral chromatic aberration has been difficult due to low symmetry with respect to the stop. The lens system described in Japanese Unexamined Patent Publication No. 2004-219610 tends to be upsized due to a long back focus. The lens system described in Japanese Unexamined Patent Publication No. 2011-209377 cannot be said that lateral chromatic aberration is sufficiently corrected.

The present invention has been developed in view of the circumstances described above, and it is an object of the present invention to provide a wide angle lens suitable for use with small imaging devices and having excellent optical property with well-corrected lateral chromatic aberration, and an imaging apparatus equipped with the wide angle lens.

A wide angle lens of the present invention consists essentially of a first lens group having a negative refractive power, a second lens group having a positive refractive power, a stop, and a third lens group having a positive refractive power, in order from the object side, in which the first lens group includes two negative meniscus lenses, each with a convex surface on the object side, the second lens group includes one pair of cemented lenses, and the third lens group includes two pairs of cemented lenses and at least one aspherical surface.

Preferably, the third lens group of the wide angle lens of the present invention includes one pair of cemented lenses, an aspherical lens, and one pair of cemented lenses, in order from the object side, the most image side cemented lens in the third lens group is formed by cementing a negative lens with a concave surface on the image side and a positive lens having a biconvex shape in this order from the object side.

Preferably, the first lens group of the wide angle lens of the present invention includes at least one aspherical surface. Further, in the wide angle lens of the present invention, the lenses constituting the first lens group are all negative lenses. Still further, in the wide angle lens of the present invention, the first lens group is preferably composed of only two or three negative meniscus lenses, each with a convex surface on the object side.

The second lens group of the wide angle lens of the present invention may be composed of only one pair of cemented lenses formed by cementing a positive lens having a biconvex shape and a negative lens with a concave shape on the object side.

The wide angle lens of the present invention preferably satisfies a conditional expression (1) given below, and more preferably satisfies a conditional expression (1') given below:

$$1.3 < f3/f < 2 \tag{1}$$

$$1.5 < f3/f < 1.8 \tag{1'}$$

where f3: focal length of the third lens group, and f: focal length of the entire system.

The wide angle lens of the present invention preferably satisfies a conditional expression (2) given below, and more preferably satisfies a conditional expression (2') give below:

$$0.4 < Y/f3 < 0.9 \tag{2}$$

$$0.5 < Y/f3 < 0.8 \tag{2'}$$

where

Y: maximum image height, and f3: focal length of the third lens group.

The wide angle lens of the present invention preferably satisfies a conditional expression (3) given below:

$$0.8 < BF/f < 1.3 \tag{3}$$

where

BF: back focus expressed in terms of air equivalent distance, and f: focal length of the entire system. For example, if a member having no refractive power, such as a filter or a cover glass, is inserted between the most image side lens and the image plane, the BF is calculated by air-converting the thickness of the member.

In the wide angle lens of the present invention, the most image side cemented lens in the third lens group preferably includes a positive lens and the wide angle lens satisfies a conditional expression (4) given below:

$$75 < v3p \quad (4)$$

where v3p: Abbe number of the most image side positive lens included in the most image side cemented lens in the third lens group with respect to the d-line.

The third lens group of the wide angle lens of the present invention is preferably composed, in order from the object side, of a cemented lens, a positive lens, an aspherical lens, and a cemented lens formed by cementing a negative lens with a concave surface on the image side and a positive lens having a biconvex shape in this order from the object side. If the third lens group is formed in this way, the aspherical lens of the third lens group is preferably a positive lens.

The wide angle lens of the present invention is preferably configured to perform focusing from an object at infinity to an object at proximity by moving only the third lens group to the object side. If focusing is performed in this way, the wide angle lens preferably satisfies a conditional expression (5) given below:

$$-0.3 < f/f12 < 0.5 \quad (5)$$

where f: focal length of the entire system, and f12: combined focal length of the first lens group and the second lens group.

The wide angle lens of the present invention preferably has a total angle of view of 80 degrees or more.

An imaging apparatus of the present invention is equipped with the wide angle lens of the present invention.

The foregoing "essentially" in the context of "consists essentially of" intends that the wide angle lens may include, a lens having essentially no refractive power, an optical element other than a lens, such as a stop, a cover glass, a filter, and the like, a lens flange, a lens barrel, an image sensor, and a mechanical component, such as a camera shake correction mechanism, in addition to the constituent elements described above.

The signs of refractive powers and surface shapes of the wide angle lens of the present invention are considered in the paraxial region for those having an aspherical surface.

The maximum height of the conditional expression (2) may be obtained, for example, from the specs of the wide angle lens or from the specs of the imaging apparatus on which the wide angle lens is installed.

According to the present invention, in a negative-leading lens type, the elements of the first lens group are set appropriately, one pair of cemented lenses and two pairs of cemented lenses are disposed in the second lens group located on the object side of the stop and in the third lens group located on the image side of the stop respectively, and the third lens group includes an aspherical lens. This allows a wide angle lens that can be used for a small imaging apparatus and has excellent optical performance with well-corrected lateral chromatic aberration, and an imaging apparatus equipped with the wide angle lens to be provided.

BRIEF DESCRIPTION OF THE DRAWINGS

FIG. 1 is a cross-sectional view of the wide angle lens of Example 1 of the present invention.

FIG. 2 is a cross-sectional view of the wide angle lens of Example 2 of the present invention.

FIG. 3 is a cross-sectional view of the wide angle lens of Example 3 of the present invention.

FIG. 4 is a cross-sectional view of the wide angle lens of Example 4 of the present invention.

Figure 5:
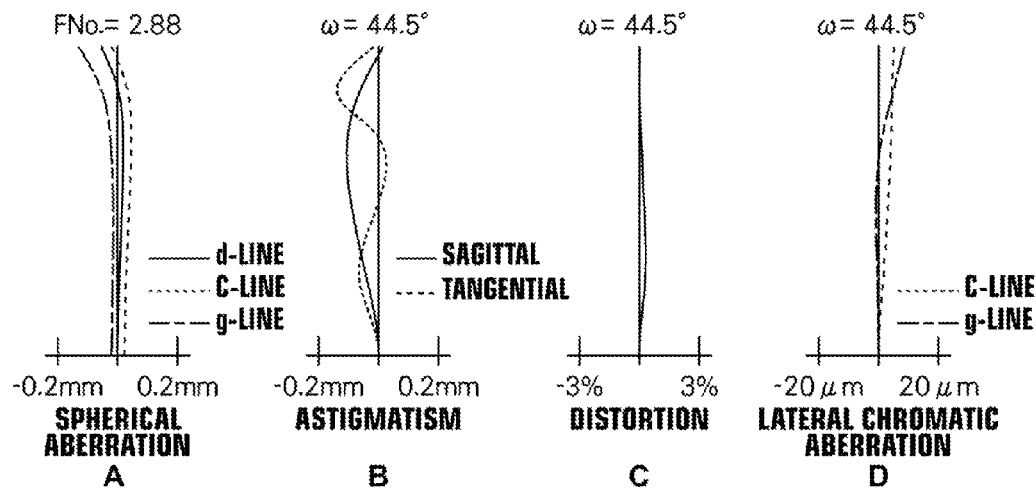

A to D of FIG. 5 illustrate each aberration diagram of the wide angle lens of Example 1.

Figure 6:
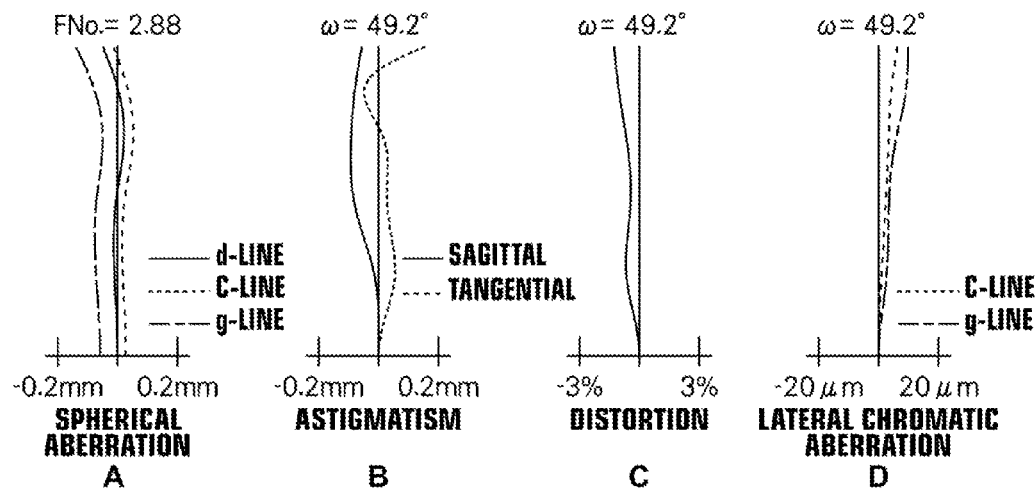

A to D of FIG. 6 illustrate each aberration diagram of the wide angle lens of Example 2.

A to D of FIG. 7 illustrate each aberration diagram of the wide angle lens of Example 3.

A to D of FIG. 8 illustrate each aberration diagram of the wide angle lens of Example 4.

Figure 9A:
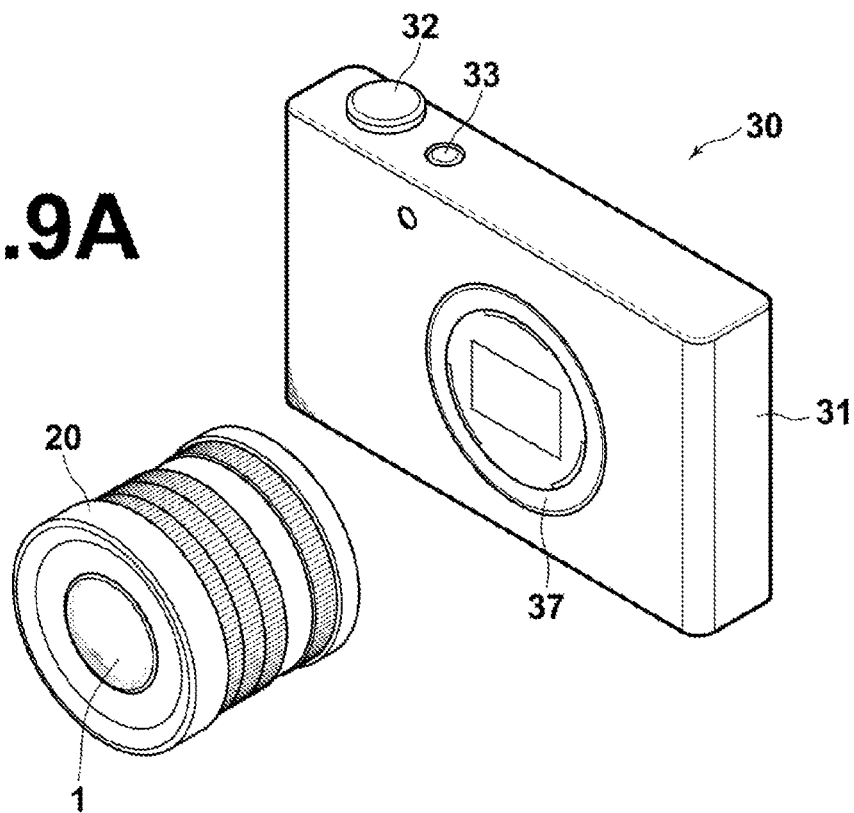

FIG. 9A is a front perspective view of an imaging apparatus according to an embodiment of the present invention.

Figure 9B:
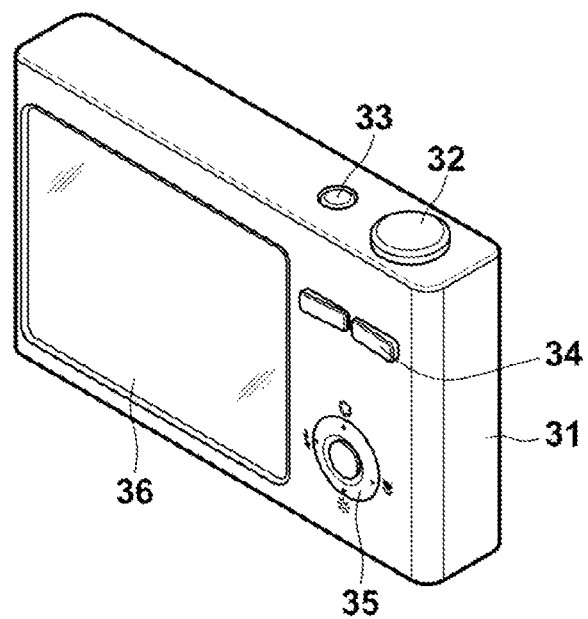

FIG. 9B is a rear perspective view of the imaging apparatus according to an embodiment of the present invention.

DESCRIPTION OF EMBODIMENTS

Hereinafter, embodiments of the present invention will be described with reference to accompanying drawings. FIGS. 1 to 4 are cross-sectional views of wide angle lenses according to embodiments of the present invention, illustrating the configurations thereof, each corresponding to each of Examples 1 to 4, to be described later. In FIGS. 1 to 4, the left side is the object side and the right side is the image side, and FIG. 1 also illustrates an axial light beam 2 and a maximum image height light beam 3 from an object at infinity. As the basic configurations and illustration methods of the examples shown in FIGS. 1 to 4 are identical, a description will be made hereinafter with reference mainly to the configuration example shown in FIG. 1, as a representative.

The wide angle lens according to an embodiment of the present invention consists essentially of a first lens group G1 having a negative refractive power, a second lens group G2 having a positive refractive power, an aperture stop St, and a third lens group G3 having a positive refractive power, in order from the object side. Note that the aperture stop St shown in FIGS. 1 to 4 does not necessarily represent the size or shape, but the position on the optical axis Z.

As it is conceivable that, when the wide angle lens is applied to an imaging apparatus, a cover glass for protecting the image sensor and various types of filters, such as a low-pass filter, an infrared cut filter, and the like, are disposed between the optical system and the image plane Sim according to the specs of the imaging apparatus, FIG. 1 illustrates an example in which a parallel plate optical member PP assuming these is disposed between the most image side lens surface and the image plane Sim. But the position of the optical member PP is not limited to that shown in FIG. 1, and a configuration without the optical member PP is also possible.

Considering the case in which the wide angle lens is applied to an imaging apparatus, FIG. 1 also illustrates an image sensor 5 disposed on the image plane Sim of the lens. Although schematically illustrated in FIG. 1, the image sensor is actually disposed such that the imaging surface thereof corresponds to the position of the image plane Sim. The image sensor 5 captures an optical image formed by the wide angle lens and converts the captured image to an electrical signal, and, for example, a CCD (Charge Coupled Device), a CMOS (Complementary Metal Oxide Semiconductor), or the like may be used.

The lens arrangement of each lens group of the example shown in FIG. 1 is as follows. That is, the first lens group G1 is composed of a lens L11 having a negative meniscus shape with a convex surface on the object side and a lens L12 having a negative meniscus shape with a convex surface on the object side in the paraxial region, in order from the object side. The second lens group G2 is composed of a lens L21 having a biconvex shape and a negative lens L22 with a concave surface on the object side in order from the object side. The third lens group G3 is composed of a negative lens L31 with a concave surface on the image side, a positive lens L32 with a convex surface on the object side, a lens L33 having a biconvex shape, a lens L34 having a positive meniscus shape with a convex surface on the image side in the paraxial region, a lens L35 having a biconcave shape, and a lens L36 having a biconvex shape. The lenses L21 and L22 are cemented, the lenses L31 and L32 are cemented, and the lenses L35 and L36 are cemented. Each of the lenses L12 and L34 has aspherical surfaces on both sides.

The wide angle lens according to an embodiment of the present invention is invented to well correct lateral chromatic aberration and to reduce the back focus in comparison with conventional retrofocus type wide angle lenses for single-lens reflex cameras, while maintaining a wide angle and favorable optical performance.

The wide angle lens according to the present embodiment is configured such that the first lens group G1 includes two negative meniscus lenses, each with a convex surface on the object side, the second lens group G2 includes one pair of cemented lenses, and the third lens group G3 includes two pairs of cemented lenses and at least one aspherical surface. Note that each of the one pair of cemented lens included in the second lens group G2 and the two pairs of cemented lenses included in the third lens group G3 has a configuration in which a positive lens and a negative lens are cemented.

Inclusion of two negative meniscus lenses, each with a convex surface on the object side, in the first lens group G1 is advantageous for increasing the angle of view. Inclusion of at least one aspherical surface in the third lens group G3 is advantageous for satisfactory correction of field curvature.

To correct lateral chromatic aberration satisfactorily, it is effective to dispose a cemented lens that includes a positive lens and a negative lens at a position as remote from the aperture stop St as possible and as close to the image plane Sim as possible. In order to realize favorable optical performance, it is necessary to satisfactorily correct not only lateral chromatic aberration but also longitudinal chromatic aberration. Inclusion of the two pairs of cemented lenses in the third lens group G3 allows one of the cemented lenses to be disposed at a position remote from the aperture stop St so as to be advantageous for the correction of lateral chromatic aberration while the other cemented lens to be disposed at a position close to the aperture stop St so as to be advantageous for the correction of longitudinal chromatic aberration.

Inclusion of the three pairs of cemented lenses; one in the second lens group G2 located on the object side of the aperture stop St and the other two in the third lens group G3 located on the image side of the aperture stop St allows lateral chromatic aberration and longitudinal chromatic aberration to be balanced well.

Further, in order to reduce the back focus while maintaining a wide angle, the wide angle lens of the present embodiment, even employing the negative-leading lens type, forms an optical system improved in symmetry in comparison with a conventional retrofocus type lens system for single-lens reflex cameras. That is, inclusion of the two pairs of cemented lenses in the third lens group G3 allows one of the pairs to be disposed near the aperture stop St, and the symmetry between the object side and the image side with respect to the aperture stop St may be improved by the foregoing cemented lens in the third lens group G3 and the cemented lens in the second lens group G2, thereby contributing to reduce the back focus.

Preferably, each lens group of the wide angle lens according to the present embodiment is further configured in the following manner. The first lens group G1 preferably includes at least one aspherical surface. If that is the case, distortion may be corrected satisfactorily.

All lenses constituting the first lens group G1 are preferably negative lenses, and if that is the case, it is advantageous for increasing the angle of view.

The first lens group G1 is preferably composed of only two or three negative meniscus lenses, each with a convex surface on the object side, as shown in FIGS. 1 and 4, and if that is the case, distortion and astigmatism may be corrected satisfactorily while implementing downsizing. If the first lens group G1 is composed of only one negative meniscus lens with a convex surface on the object side, satisfactory correction of distortion and astigmatism is difficult. If the first lens group G1 is composed of four or more lenses, the lens system is upsized.

Preferably, the most object side lens element in the second lens group G2 has a positive refractive power, and if that is the case, convergence effect may be given to a light beam which is in the tendency of diffusion after propagating from the object side and passing through the first lens group G1 by the most object side positive lens element in the second lens group G2, whereby the ray height may be suppressed and the amount of aberration generated may be suppressed. The term "lens element" as used herein refers to a lens having only two air contacting surfaces on the optical axis, one on the object side and the other on the image side, and one lens element refers to one single lens or one pair of cemented lenses. That is, a single lens having a positive refractive power or a cemented lens having a positive refractive power is preferably disposed on the most object side in the second lens group G2.

In the example shown in FIG. 1, a cemented lens formed by cementing a positive lens and a negative lens is disposed on the most object side in the second lens group G2. The lens arrangement sequence may be a positive lens and a negative lens in order from the object side or vice versa.

In the example shown in FIG. 1, the second lens group G2 is composed of only one pair of cemented lenses formed by cementing a positive lens having a biconvex shape and a negative lens with a concave shape on the object side. If such is the case, lateral chromatic aberration may be corrected satisfactorily and easily while suppressing upsizing of the lens system by using as less number of lenses as possible.

Preferably, the third lens group G3 includes one pair of cemented lenses, an aspherical lens, and one pair of cemented lens in order from the object side, and the most image side cemented lens in the third lens group G3 is formed by cementing a negative lens with a concave surface on the image side and a positive lens having a biconvex shape in this order from the object side. In the third lens group G3, by the disposition of the cemented lenses, each on the object side and on the image side of the aspherical lens, lateral chromatic aberration and longitudinal chromatic aberration may be corrected satisfactorily. Formation of the most image side cemented lens in the third lens group G3 by cementing a negative lens and a positive lens in this order from the object side allows lateral chromatic aberration to be corrected satisfactorily. Further, formation of the cemented surface of the cemented lens in a concave shape on the image side allows the refractive power of the positive lens of the cemented lens to be increased, whereby lateral chromatic aberration may be corrected more satisfactorily.

In the third lens group G3 of the example shown in FIG. 1, the lens L31 and the lens L32 are cemented to form a cemented lens, the lens L33 is a positive lens, the lens L34 is an aspherical lens, and the lens L35 and the lens L36 are cemented to form a cemented lens. As shown in FIG. 1, the third lens group G3 is preferably composed, in order from the object side, of a cemented lens, a positive lens, an aspherical lens, and a cemented lens formed by cementing a negative lens with a concave surface on the image side and a positive lens having a biconvex shape in this order from the object side, in view of the following circumstances.

It is preferable that the cemented lens composed of the negative lens L35 and the positive lens L36 is disposed on the most image side in the third lens group G3 in order to satisfactorily correct lateral chromatic aberration. Since the lens L34, which is an aspherical lens, is more effective for correcting off-axis aberrations if it is disposed more remote from the aperture stop St and at more image side, the lens L34 is preferably disposed second from the image side in the third lens group G3. Astigmatism and field curvature may be corrected satisfactorily by this aspherical lens. It is preferable that the cemented lens composed of the negative lens L31 and the positive lens L32 is disposed on the most object side in the third lens group G3 in order to satisfactorily correct longitudinal chromatic aberration. The positive lens L33 may share the positive refractive power with the positive lens L32 constituting the object side cemented lens in the third lens group G3 and may satisfactorily correct spherical aberration. In order to share the positive refractive power, the lens L33 is preferably a biconvex lens.

If the third lens group G3 is composed of six lenses formed in the foregoing manner, the aspherical lens in the third lens group G3 preferably has a positive refractive power at least in the paraxial region. Use of a positive lens as the aspherical lens in the third lens group G3 allows astigmatism and field curvature to be corrected more satisfactorily.

Note that most of the conventional retrofocus type wide angle lenses for single-lens reflex cameras employ a configuration in which a positive single lens is disposed on the most image side of the entire system, and such configuration will force the object side lens group to bear a heavy burden of correcting lateral chromatic aberration. In contrast, the configuration in which the cemented lens is disposed on the most image side in the third lens group G3 of the present embodiment shown in FIG. 1 allows lateral chromatic aberration to be corrected satisfactorily without forcing the object side lens groups to bear a large burden.

Further, in comparison with the conventional configuration in which a positive single lens is disposed on the most image side of the entire system, in the configuration in which the cemented lens is disposed on the most image side in the third lens group G3 of the present embodiment shown in FIG. 1, if the cemented lens is viewed as one lens element, the positive refractive power of the lens element disposed on the most image side of the entire system may be reduced or it is possible to dispose a lens element having a negative refractive power on the most image side of the entire system. This allows symmetry of the lens system to be improved, in comparison with the conventional retrofocus type wide angle lenses for single-lens reflex cameras, thereby contributing to reduce the back focus.

From the foregoing circumstances, the lens element formed of the lens L35 and the lens L36 disposed on the most image side in the third lens group G3 preferably has a meniscus shape. From the circumstances described above, the lens L35 is preferably a biconcave lens. In addition, the lens L34 located on the object side of the lens L35 is preferably a meniscus lens with a convex surface on the image side in the paraxial region for downsizing.

Preferably, the wide angle lens of the present embodiment satisfies a conditional expression (1) given below:

$$1.3 < f3/f < 2 \tag{1}$$

where f3: focal length of the third lens group, and f: focal length of the entire system.

If the wide angle lens does not satisfy the lower limit of the conditional expression (1), the load of the third lens group G3 is increased while the load of the optical system that combines the first lens group G1 and the second lens group G2 is reduced, whereby the angle between a light ray incident on the third lens group G3 and the optical axis Z is increased, causing difficulty for the third lens group G3 to perform aberration correction, in which lateral chromatic aberration is particularly aggravated. If the wide angle lens does not satisfy the upper limit of the conditional expression (1), the load of the optical system that combines the first lens group G1 and the second lens group G2 is increased, thereby causing difficulty for the first lens group G1 and the second lens group G2 to perform aberration correction, in which field curvature is particularly aggravated. Further, if the wide angle lens does not satisfy the upper limit of the conditional expression (1), the back focus is increased and the overall length (distance from the most object side surface to the image plane Sim on the optical axis) of the lens system is increased. Satisfaction of the conditional expression (1) allows the back focus to be reduced, and field curvature and lateral chromatic aberration to be corrected satisfactorily.

From the circumstances described above, the wide angle lens more preferably satisfies a conditional expression (1') given below for the back focus reduction and more satisfactory correction of field curvature and lateral chromatic aberration.

$$1.5 < f3/f < 1.8 \tag{1'}$$

Further, the wide angle lens of the present embodiment preferably satisfies a conditional expression (2) given below:

$$0.4 < Y/f3 < 0.9 \tag{2}$$

where

Y: maximum image height, and f3: focal length of the third lens group.

If the wide angle lens does not satisfy the lower limit of the conditional expression (2), the overall length of the lens system is increased. If the wide angle lens does not satisfy the upper limit of the conditional expression (2), the angle of a light ray incident on the image plane Sim is increased. Satisfaction of the conditional expression (2) facilitates the reduction in the overall length of the lens system and the angle suppression for a light ray incident on the image plane Sim.

From the circumstances described above, the wide angle lens more preferably satisfies a conditional expression (2) given below for further facilitating the reduction in the overall length of the lens system and the angle suppression for a light ray incident on the image plane Sim.

$$0.5 < Y/f3 < 0.8 \tag{2'}$$

Further, the wide angle lens of the present embodiment preferably satisfies a conditional expression (3) given below:

$$0.8 < BF/f < 1.3 \tag{3}$$

where

BF: back focus (air equivalent distance), and f: focal length of the entire system.

If the wide angle lens does not satisfy the lower limit of the conditional expression (3), the lens system may possibly interfere with a member disposed near the image plane when the wide angle lens is installed on an imaging apparatus. If the wide angle lens does not satisfy the upper limit of the conditional expression (3), the asymmetry between the object side and the image side of the aperture stop St is increased, causing difficulty in lateral chromatic aberration correction. Satisfaction of the conditional expression (3) allows lateral chromatic aberration to be corrected satisfactorily, while ensuring a space required for disposing a member.

Preferably, the most image side cemented lens in the third lens group G3 is formed to include a positive lens and the wide angle lens of the present embodiment satisfies a conditional expression (4) given below:

$$75 < v3p \quad (4)$$

where v3p: Abbe number of the most image side positive lens included in the most image side cemented lens in the third lens group with respect to the d-line.

If the wide angle lens does not satisfy the conditional expression (4), it is difficult to correct lateral chromatic aberration, in particular, high order lateral chromatic aberration. Satisfaction of the conditional expression (4) allows lateral chromatic aberrations to be corrected in well-balanced manner.

Further, the wide angle lens of the present embodiment preferably performs focusing from an object at infinity to an object at proximity by moving only the third lens group G3 to the object side. If such is the case, the image plane tilt that may occur at the time of focusing an object at proximity may be suppressed.

In the case in which the focusing is performed by the third lens group G3, the wide angle lens preferably satisfies a conditional expression (5) given below. Satisfaction of the conditional expression (5) facilitates the suppression of variation in spherical aberration at the time of focusing.

$$-0.3 < f/f12 < 0.5 \quad (5)$$

where f: focal length of the entire system, and f12: combined focal length of the first lens group and the second lens group.

The wide angle lens of the present invention preferably has a total angle of view of 80 degrees or more in order to achieve an increased angle of view.

The foregoing preferable configurations may be combined in any way, and are preferably employed selectively, as appropriate, according to the specifications required of the wide angle lens. Appropriate employment of the preferable configurations allows an optical system having more favorable optical performance or an optical system that complies with higher specifications to be realized.

Next, numerical examples of the wide angle lens of the present invention will be described.

Example 1

The lens cross-section view of the wide angle lens of Example 1 is as illustrated in FIG. 1. As the illustration method is as described above, duplicated description will be omitted here.

The schematic configuration of the wide angle lens of Example 1 is as follows. That is, the wide angle lens consists of a first lens group G1 having a negative refractive power, a second lens group G2 having a positive refractive power, an aperture stop St, and a third lens group G3 having a positive refractive power, in order from the object side. The first lens group G1 is composed of lens L11 having a negative meniscus shape with a convex surface on the object side and a lens L12 having a negative meniscus shape with a convex surface on the object side in the paraxial region, in order from the object side. The second lens group G2 is composed of a lens L21 having a biconvex shape and a negative lens L22 having a biconcave shape in order from the object side. The third lens group G3 is composed of a lens L31 having a biconcave shape, a lens L32 having a positive meniscus shape with a convex surface on the object side, a lens L33 having a biconvex shape, a lens L34 having a positive meniscus shape with a convex surface on the image side in the paraxial region, a lens L35 having a biconcave shape, and a lens L36 having a biconvex shape. The lenses L21 and L22 are cemented, the lenses L31 and L32 are cemented, and the lenses L35 and L36 are cemented. The other lenses are uncemented single lenses. Each of the lenses L12 and L34 has aspherical surfaces on both sides.

As a detailed configuration of the wide angle lens of Example 1, basic lens data and aspherical surface coefficients of the lens are shown in Table 1 and Table 2 respectively. The symbols f, BF, 2ω, and FNo. in the upper margin of Table 1 represent the focal length of the entire system, the back focus (air equivalent distance), the total angle of view, and F-number respectively, all of which are with respect to the d-line.

The Si column in Table 1 indicates the $i^{th}$ surface number in which a number i (i=1, 2, 3, - - - ) is given to each surface in a serially increasing manner toward the image side with the object side surface of the most object side constituent element being taken as the first surface. The Ri column indicates the radius of curvature of the $i^{th}$ surface. The Di column indicates the surface distance between the $i^{th}$ surface and the $(i+1)^{th}$ surface on the optical axis Z. The sign of the radius of curvature is positive if the surface shape is convex on the object side and negative if it is convex on the image side.

The Ndj column in Table 1 indicates the refractive index of the $j^{th}$ optical element with respect to the d-line (wavelength 587.56 nm) in which a number j (j=1, 2, 3, - - - ) is given to each constituent element in a serially increasing manner toward the image side with the most object side constituent element being taken as the first element, and the vdj column indicates the Abbe number of the $j^{th}$ optical element with respect to the d-line. Note that the aperture stop St and the optical member PP are included in Table 1, and the surface number column corresponding to the aperture stop St includes the word "(St)" in addition to the surface number.

A surface whose surface number includes an "*" mark attached thereto in Table 1 is an aspherical surface and a value of paraxial radius of curvature is shown in the radius of curvature column of the aspherical surface in Table 1. Aspherical surface coefficients of these aspherical surfaces are shown in Table 2. The Si column in Table 2 indicates the surface numbers of the aspherical surfaces. The "E-n" (n: integer) in the values of aspherical surface coefficients represents "×10$^{-n}$". The aspherical surface coefficients represent values of coefficients K and Am (m=3, 4, 5, - - - and 20) in the aspherical surface expression represented by the formula given below.

$$Zd = C \cdot h^2 / \{1 + (1 - K \cdot C^2 \cdot h^2)^{1/2}\} + \Sigma Am \cdot h^m$$

where $Z_d$: depth of aspherical surface (length of vertical line extended from a point on the aspherical surface at height h to a flat surface orthogonal to the optical axis to which the aspherical apex contacts)

h: height (distance from the optical axis to the lens surface)

C: paraxial curvature

K, Am: aspherical surface coefficients (m=3, 4, 5, - - - and 20)

In each table shown below, "degree" is used as the unit of angle, and "mm" is used as the unit of length. But, other appropriate units may also be used, as optical systems can be used by proportionally enlarged or reduced. Further, each table shown below indicates values rounded to a predetermined digit.

TABLE 1

Example 1 Basic Lens Data
f = 14.47, BF = 13.30, 2ω = 89.0, FNo. = 2.88

| Si | Ri | Di | Ndj | vdj |
|---|---|---|---|---|
| 1 | 45.470 | 1.28 | 1.57135 | 53.0 |
| 2 | 13.366 | 5.87 | | |
| *3 | 34.115 | 2.50 | 1.58312 | 59.4 |
| *4 | 8.652 | 4.36 | | |
| 5 | 19.242 | 9.35 | 1.88299 | 40.8 |
| 6 | −15.365 | 1.04 | 1.59270 | 35.3 |
| 7 | 65.976 | 3.50 | | |
| 8 (St) | ∞ | 4.00 | | |
| 9 | −135.660 | 0.81 | 1.54072 | 47.2 |
| 10 | 10.267 | 3.56 | 1.49700 | 81.5 |
| 11 | 310.980 | 0.15 | | |
| 12 | 16.670 | 4.58 | 1.59522 | 67.7 |
| 13 | −38.648 | 3.48 | | |
| *14 | −31.646 | 3.99 | 1.58312 | 59.4 |
| *15 | −14.923 | 0.15 | | |
| 16 | −24.453 | 1.05 | 1.67300 | 38.1 |
| 17 | 21.331 | 8.08 | 1.49700 | 81.5 |
| 18 | −21.331 | 11.46 | | |
| 19 | ∞ | 2.80 | 1.51680 | 64.2 |
| 20 | ∞ | | | |

TABLE 2

Example 1 Aspherical Surface Coefficient

| Si | 3 | 4 | 14 | 15 |
|---|---|---|---|---|
| K | 0.0000000E+00 | 0.0000000E+00 | 0.0000000E+00 | 0.0000000E+00 |
| A3 | 1.0465349E−03 | −2.0064589E−04 | 6.6209788E−04 | 1.8582591E−03 |
| A4 | −1.4397107E−03 | 8.7627361E−04 | −3.0527109E−04 | −2.2581890E−03 |
| A5 | 1.0398983E−03 | −4.6280566E−04 | −3.7260454E−04 | 1.3297504E−03 |
| A6 | −3.1920537E−04 | 5.4357538E−05 | 5.0663981E−04 | −2.6424215E−04 |
| A7 | 9.8764948E−06 | 5.3965805E−05 | −2.4264898E−04 | −5.0654566E−05 |
| A8 | 2.0049033E−05 | −1.8881007E−05 | 3.8450732E−05 | 2.8177517E−05 |
| A9 | −4.5234440E−06 | −1.2980213E−06 | 9.5922739E−06 | −8.5212341E−07 |
| A10 | −1.2044515E−07 | 1.4300798E−06 | −4.7789385E−06 | −1.1794696E−06 |
| A11 | 1.6644987E−07 | −9.8782930E−08 | 4.4093736E−07 | 1.0703228E−07 |
| A12 | −1.5441504E−08 | −4.7407088E−08 | 1.0955244E−07 | 3.2734368E−08 |
| A13 | −2.0089199E−09 | 6.8759162E−09 | −2.6889472E−08 | −4.4313123E−09 |
| A14 | 4.2314856E−10 | 6.8689587E−10 | 5.1554995E−10 | −5.5463438E−10 |
| A15 | −4.4798993E−12 | −1.7107481E−10 | 4.1805549E−10 | 1.0524468E−10 |
| A16 | −4.0229593E−12 | −1.2623540E−12 | −4.3160704E−11 | 4.0137487E−12 |
| A17 | 2.6771169E−13 | 1.9335761E−12 | −6.5726519E−13 | −1.3923536E−12 |
| A18 | 8.8641130E−15 | −6.5410638E−14 | 3.3491667E−13 | 2.3442922E−14 |
| A19 | −1.4680780E−15 | −8.3761467E−15 | −1.8401488E−14 | 7.1987544E−15 |
| A20 | 4.1786408E−17 | 4.7807633E−16 | 2.8240933E−16 | −3.4821496E−16 |

A to D of FIG. 5 are aberration diagrams of spherical aberration, astigmatism, distortion and lateral chromatic aberration of the wide angle lens of Example 1. The "FNo." in the spherical aberration diagram indicates the F-number, and "ω" in the other aberration diagrams indicates the half angle of view. Each aberration diagram illustrates aberration with the d-line (wavelength 587.56 nm) as the reference wavelength. But the spherical aberration diagram also indicates aberrations with respect to the C-line (wavelength 656.27 nm) and the g-line (wavelength 435.84 nm), and the lateral chromatic aberration diagram illustrates aberrations with respect to the C-line and the g-line. In the astigmatism diagram, astigmatism in the sagittal direction is indicated by the solid line and astigmatism in the tangential direction is indicated by the dotted line. A to D of FIG. 5 are those when the object distance is infinity.

The illustration method, and symbols in each table, their meanings, representation method, and the like described in Example 1 are applied also to the following examples unless otherwise specifically described, and duplicated description will be omitted herein below.

Example 2

The lens cross-section view of the wide angle lens of Example 2 is as illustrated in FIG. 2. The schematic configuration of the wide angle lens of Example 2 is identical to that of Example 1 other than that the lens L31 has a negative meniscus shape with a concave surface on the image side. Table 3 and Table 4 respectively show basic lens data and aspherical surface coefficients of the wide angle lens of Example 2. A to D of FIG. 6 show each aberration diagram of the wide angle lens of Example 2.

TABLE 3

Example 2 Basic Lens Data
f = 12.42, BF = 13.92, 2ω = 98.4, FNo. = 2.88

| Si | Ri | Di | Ndj | vdj |
|---|---|---|---|---|
| 1 | 31.679 | 1.28 | 1.62041 | 60.3 |
| 2 | 21.755 | 6.18 | | |
| *3 | 41.937 | 2.50 | 1.55332 | 71.7 |

TABLE 3-continued

Example 2 Basic Lens Data
f = 12.42, BF = 13.92, 2ω = 98.4, FNo. = 2.88

| Si | Ri | Di | Ndj | vdj |
|---|---|---|---|---|
| *4 | 6.257 | 6.30 | | |
| 5 | 19.215 | 7.16 | 1.83481 | 42.7 |
| 6 | −139.995 | 4.00 | 1.84666 | 23.8 |
| 7 | 536.465 | 3.50 | | |
| 8 (St) | ∞ | 4.00 | | |
| 9 | 67.404 | 0.80 | 1.51742 | 52.4 |
| 10 | 10.317 | 3.06 | 1.49700 | 81.5 |
| 11 | 50.345 | 0.15 | | |
| 12 | 15.569 | 4.11 | 1.59522 | 67.7 |
| 13 | −31.758 | 1.67 | | |
| *14 | −52.044 | 3.18 | 1.58312 | 59.4 |
| *15 | −17.033 | 0.78 | | |
| 16 | −22.999 | 1.05 | 1.67300 | 38.1 |
| 17 | 16.134 | 7.39 | 1.49700 | 81.5 |
| 18 | −19.673 | 12.07 | | |
| 19 | ∞ | 2.80 | 1.51680 | 64.2 |
| 20 | ∞ | | | |

TABLE 4

Example 2 Aspherical Surface Coefficient

| Si | 3 | 4 | 14 | 15 |
|---|---|---|---|---|
| K | 0.0000000E+00 | 0.0000000E+00 | 0.0000000E+00 | 0.0000000E+00 |
| A3 | 2.3098156E−04 | 7.8944138E−04 | 8.5435899E−04 | 1.7560374E−03 |
| A4 | −7.9684527E−05 | −7.4165233E−05 | −3.5809953E−04 | −2.1654364E−03 |
| A5 | 7.4148043E−07 | 5.5987973E−06 | −3.5108360E−04 | 1.3249362E−03 |
| A6 | 2.6442388E−07 | 1.3540696E−07 | 5.0611688E−04 | −2.6243663E−04 |
| A7 | −2.5981708E−09 | 6.3708343E−09 | −2.4268228E−04 | −5.0645193E−05 |
| A8 | −3.8647193E−10 | −1.5971584E−10 | 3.8448718E−05 | 2.8174416E−05 |
| A9 | −1.0143574E−11 | −3.3371890E−11 | 9.5921388E−06 | −8.5230122E−07 |
| A10 | 2.2413755E−14 | −2.2169599E−12 | −4.7789463E−06 | −1.1794753E−06 |
| A11 | 1.4040389E−14 | −1.0562593E−13 | 4.4093697E−07 | 1.0703219E−07 |
| A12 | 8.1153262E−16 | −4.2305060E−15 | 1.0955242E−07 | 3.2734371E−08 |
| A13 | 3.3705352E−17 | −1.5205194E−16 | −2.6889473E−08 | −4.4313120E−09 |
| A14 | 1.1986022E−18 | −5.0758195E−18 | 5.1554992E−10 | −5.5463435E−10 |
| A15 | 3.8491657E−20 | −1.6063042E−19 | 4.1805549E−10 | 1.0524469E−10 |
| A16 | 1.1171501E−21 | −4.8812100E−21 | −4.3160704E−11 | 4.0137488E−12 |
| A17 | 2.8284968E−23 | −1.4368679E−22 | −6.5726519E−13 | −1.3923536E−12 |
| A18 | 5.6264007E−25 | −4.1224244E−24 | 3.3491667E−13 | 2.3442922E−14 |
| A19 | 3.1461307E−27 | −1.1579251E−25 | −1.8401488E−14 | 7.1987544E−15 |
| A20 | −4.6068896E−28 | −3.1954136E−27 | 2.8240933E−16 | −3.4821496E−16 |

Example 3

The lens cross-section view of the wide angle lens of Example 3 is as illustrated in FIG. 3. The schematic configuration of the wide angle lens of Example 3 is identical to that of Example 1 other than that the lens L22 has a negative meniscus shape with a concave surface on the object side and the lens L32 has a biconvex shape. Table 5 and Table 6 respectively show basic lens data and aspherical surface coefficients of the wide angle lens of Example 3. A to D of FIG. 7 show each aberration diagram of the wide angle lens of Example 3.

TABLE 5

Example 3 Basic Lens Data
f = 15.46, BF = 17.45, 2ω = 85.9, FNo. = 2.88

| Si | Ri | Di | Ndj | vdj |
|---|---|---|---|---|
| 1 | 67.368 | 1.28 | 1.62041 | 60.3 |
| 2 | 14.272 | 2.33 | | |
| *3 | 9.467 | 2.50 | 1.69680 | 55.5 |
| *4 | 6.253 | 7.99 | | |
| 5 | 19.224 | 10.32 | 1.83481 | 42.7 |
| 6 | −24.614 | 4.00 | 1.84666 | 23.8 |
| 7 | −49.334 | 3.50 | | |
| 8 (St) | ∞ | 4.00 | | |
| 9 | −14.173 | 0.80 | 1.51742 | 52.4 |
| 10 | 14.108 | 2.95 | 1.49700 | 81.5 |
| 11 | −579.192 | 0.15 | | |
| 12 | 26.417 | 5.15 | 1.59522 | 67.7 |
| 13 | −14.112 | 0.16 | | |
| *14 | −75.656 | 2.70 | 1.58312 | 59.4 |
| *15 | −15.853 | 0.15 | | |
| 16 | −14.184 | 1.05 | 1.67300 | 38.1 |

TABLE 5-continued

Example 3 Basic Lens Data
f = 15.46, BF = 17.45, 2ω = 85.9, FNo. = 2.88

| Si | Ri | Di | Ndj | vdj |
|---|---|---|---|---|
| 17 | 61.544 | 4.54 | 1.49700 | 81.5 |
| 18 | −21.894 | 15.60 | | |
| 19 | ∞ | 2.80 | 1.51680 | 64.2 |
| 20 | ∞ | | | |

TABLE 6

Example 3 Aspherical Surface Coefficient

| Si | 3 | 4 | 14 | 15 |
|---|---|---|---|---|
| K | 0.0000000E+00 | 0.0000000E+00 | 0.0000000E+00 | 0.0000000E+00 |
| A3 | 2.3208661E−04 | 6.5424628E−04 | 1.0529056E−03 | 2.0038988E−03 |
| A4 | 4.0524370E−05 | −1.3653009E−05 | −5.2257638E−04 | −2.4316313E−03 |
| A5 | −1.4850516E−05 | −7.1675113E−06 | −3.4473682E−04 | 1.3262039E−03 |
| A6 | 6.1217287E−07 | −7.0296219E−07 | 5.0279297E−04 | −2.6396988E−04 |
| A7 | 1.2975616E−08 | 2.8444010E−08 | −2.4284857E−04 | −5.0891205E−05 |
| A8 | −1.1303789E−09 | 2.3450021E−09 | 3.8449764E−05 | 2.8162254E−05 |
| A9 | −6.5526765E−11 | −2.9623894E−11 | 9.5929360E−06 | −8.5213671E−07 |
| A10 | −2.5470778E−13 | −1.1374226E−11 | −4.7788576E−06 | −1.1793944E−06 |
| A11 | 1.4919223E−13 | −7.6921193E−13 | 4.4094477E−07 | 1.0704065E−07 |
| A12 | 9.7671945E−15 | −2.0771859E−14 | 1.0955305E−07 | 3.2734998E−08 |
| A13 | 2.2050248E−16 | 8.1358888E−16 | −2.6889425E−08 | −4.4312739E−09 |
| A14 | −1.4298172E−17 | 1.7301302E−16 | 5.1555347E−10 | −5.5463237E−10 |
| A15 | −2.0056774E−18 | 1.4373148E−17 | 4.1805574E−10 | 1.0524477E−10 |
| A16 | −1.3015281E−19 | 9.1125714E−19 | −4.3160688E−11 | 4.0137518E−12 |
| A17 | −4.8979331E−21 | 4.6402524E−20 | −6.5726414E−13 | −1.3923535E−12 |
| A18 | 4.1230613E−23 | 1.8143374E−21 | 3.3491673E−13 | 2.3442918E−14 |
| A19 | 2.7123602E−23 | 3.5704141E−23 | −1.8401484E−14 | 7.1987538E−15 |
| A20 | 3.1611918E−24 | −2.3804147E−24 | 2.8240955E−16 | −3.4821501E−16 |

Example 4

The lens cross-section view of the wide angle lens of Example 4 is as illustrated in FIG. 4. The schematic configuration of the wide angle lens of Example 4 is identical to that of Example 1 other than that the first lens group G1 is composed of three lenses and the lens L13 having a negative meniscus shape with a convex surface on the object side is disposed on the most image side in the first lens group GL and the lens L31 has a negative meniscus shape with a concave surface on the image side. Table 7 and Table 8 respectively show basic lens data and aspherical surface coefficients of the wide angle lens of Example 4. A to D of FIG. 8 show each aberration diagram of the wide angle lens of Example 4.

TABLE 7

Example 4 Basic Lens Data
$f = 12.37$, $BF = 14.04$, $2\omega = 99.0$, $FNo. = 2.88$

| Si | Ri | Di | Ndj | vdj |
|---|---|---|---|---|
| 1 | 31.408 | 2.20 | 1.58913 | 61.3 |
| 2 | 17.011 | 3.22 | | |
| 3 | 26.595 | 2.50 | 1.60311 | 60.7 |
| 4 | 12.683 | 7.25 | | |
| *5 | 75.860 | 2.65 | 1.58313 | 59.5 |
| *6 | 10.509 | 3.00 | | |
| 7 | 18.638 | 8.30 | 1.88299 | 40.8 |
| 8 | −13.211 | 2.71 | 1.59270 | 35.3 |
| 9 | 44.449 | 2.60 | | |
| 10 (St) | ∞ | 3.71 | | |
| 11 | 67.064 | 1.16 | 1.53172 | 48.9 |
| 12 | 10.006 | 3.70 | 1.49700 | 81.5 |
| 13 | 37.905 | 0.30 | | |
| 14 | 19.245 | 7.50 | 1.59522 | 67.7 |
| 15 | −16.787 | 0.65 | | |
| *16 | −31.713 | 4.30 | 1.58313 | 59.5 |
| *17 | −14.914 | 0.25 | | |
| 18 | −18.627 | 1.10 | 1.67300 | 38.1 |
| 19 | 21.196 | 7.01 | 1.49700 | 81.5 |
| 20 | −21.196 | 12.19 | | |
| 21 | ∞ | 2.80 | 1.51680 | 64.2 |
| 22 | ∞ | | | |

TABLE 8

Example 4 Aspherical Surface Coefficient

| Si | 5 | 6 | 16 | 17 |
|---|---|---|---|---|
| K | −1.0285720E−02 | 1.4043536E−01 | 1.0240310E−03 | −3.0740881E−01 |
| A3 | 4.1728080E−03 | 2.8792190E−03 | 2.6703990E−03 | 2.7602110E−03 |
| A4 | −2.9830950E−03 | −1.8728560E−03 | −3.5429720E−03 | −2.1348440E−03 |
| A5 | 1.4714270E−03 | 9.5813300E−04 | 2.3253900E−03 | 8.8915700E−04 |
| A6 | −3.7469100E−04 | −2.2139000E−04 | −8.5342000E−04 | −2.1861500E−04 |
| A7 | 3.8312700E−05 | 2.3161700E−05 | 1.6286800E−04 | 4.4052300E−05 |
| A8 | 3.2722100E−06 | −2.1918400E−06 | −1.3994000E−05 | −1.2796700E−05 |
| A9 | −9.799100E−07 | 1.1920100E−06 | 9.5147800E−07 | 3.5835600E−06 |
| A10 | −3.4560800E−08 | −3.3863900E−07 | −3.2431000E−07 | −6.0927700E−07 |
| A11 | 2.2076400E−08 | 2.9847600E−08 | 3.7693700E−08 | 5.9940200E−08 |
| A12 | −4.8081700E−10 | 2.4066400E−09 | 3.9788900E−09 | −5.2200300E−09 |
| A13 | −1.8128300E−10 | −4.4921100E−10 | −8.9748000E−10 | 7.2453300E−10 |
| A14 | −1.6267800E−11 | −1.6442100E−12 | 7.9101800E−11 | −7.8309500E−11 |
| A15 | 5.0473900E−12 | −2.1115500E−12 | −1.4937100E−11 | 6.0458400E−12 |
| A16 | −1.2428400E−13 | 5.1648300E−13 | 1.1027500E−12 | −9.6095700E−13 |
| A17 | −2.4973700E−14 | 1.3842800E−13 | 8.6380700E−14 | 1.4273200E−13 |

TABLE 8-continued

Example 4 Aspherical Surface Coefficient

| Si  | 5              | 6              | 16             | 17             |
|-----|----------------|----------------|----------------|----------------|
| A18 | 5.9618600E−16  | −3.3436500E−14 | 8.4905400E−16  | −9.8466000E−15 |
| A19 | 1.2331100E−16  | 2.3612900E−15  | −2.1987400E−15 | 2.3158500E−16  |
| A20 | −5.5625400E−18 | −5.4516400E−17 | 1.2539700E−16  | 1.3202900E−18  |

Table 9 shows values corresponding to the conditional expressions (1) to (5) and values related to the conditional expressions of Examples 1 to 4. The symbols "Y", "f3" and "f12" in Table 9 represent the maximum image height, the focal length of the third lens group G3, and the combined focal length of the first lens group G1 and the second lens group G2 respectively. The values shown in Table 9 are those with respect to the d-line.

TABLE 9

|                          |       | Example 1 | Example 2 | Example 3 | Example 4 |
|--------------------------|-------|-----------|-----------|-----------|-----------|
| Conditional Expression (1) | f3/f  | 1.641     | 1.581     | 1.785     | 1.707     |
| Conditional Expression (2) | Y/f3  | 0.598     | 0.723     | 0.514     | 0.673     |
| Conditional Expression (3) | BF/f  | 0.919     | 1.121     | 1.129     | 1.135     |
| Conditional Expression (4) | v3p   | 81.5      | 81.5      | 81.5      | 81.5      |
| Conditional Expression (5) | f/f12 | −0.012    | −0.253    | 0.396     | −0.127    |
|                          | Y     | 14.2      | 14.2      | 14.2      | 14.2      |
|                          | f3    | 23.75     | 19.64     | 27.6      | 21.11     |
|                          | f12   | −1175.35  | −49.01    | 39.05     | −97.62    |

As is known from the foregoing data, the entire system of each of the wide angle lenses of Examples 1 to 4 is formed compact with ten or eleven lenses, and has a F-number of 2.88 and high optical performance with well corrected aberrations, including lateral chromatic aberration, while achieving a wide angle of about 85° to 99° in total angle of view. Each of the wide angle lenses of Examples 1 to 4 is reduced in back focus and has a shorter length in the overall lens system than those of retrofocus type wide angle lenses that have conventionally been used frequently for single-lens reflex cameras, and can be used favorably, for example, in mirror-less cameras.

Next, one embodiment of the imaging apparatus according to the present invention will be described with reference to FIGS. 9A and 9B. The camera 30 whose perspective shapes are shown in FIGS. 9A and 9B is a so-called mirror-less single-lens digital camera to which an interchangeable lens 20 is removably attached. FIG. 9A illustrates an appearance of the camera 30 viewed from the front side while FIG. 9B illustrates an appearance of the camera 30 viewed from the rear side.

The camera 30 includes a camera body 31, and a shutter button 32 and a power button 33 are provided on the upper surface thereof. Further, operation buttons 34, 35 and display section 36 are provided on the rear surface of the camera body 31. The display section 36 is used for displaying a captured image and an image within the angle of view before being captured.

An image capturing opening from which light from an imaging target enters is provided at the center of the front surface of the camera body 31 and a mount 37 is provided at a position corresponding to the image capturing opening, in which the interchangeable lens 20 is attached to the camera body 31 via the mount 37. The interchangeable lens 20 includes a lens barrel in which a wide angle lens 1 according to an embodiment of the present invention is housed.

The camera body 31 includes therein an image sensor, such as a CCD or the like, (not shown) that receives a subject image formed by the interchangeable lens 20 and outputs an imaging signal according to the received image, a signal processing circuit that generates an image by processing the imaging signal outputted from the image sensor, a recording medium for recording the generated image, and the like. In the camera 30, one frame of still image is captured when the shutter button 32 is pressed and the image data obtained by the imaging are recorded on the recording medium.

So far, the present invention has been described by way of the embodiments and Examples, but it should be understood the present invention is not limited to the foregoing embodiments and Examples, and various modifications may be made. For example, values of the radius of curvature of each lens, surface distance, refractive index, Abbe number, aspherical surface coefficient, and the like are not limited to those illustrated in each numerical example and may take other values.

In the embodiment of the imaging apparatus, the description has been made of a case in which the present invention is applied to a mirror-less single-lens digital camera, but the present invention is not limited to this and is also applicable to other imaging apparatuses such as, for example, single-lens reflex cameras, film cameras, video cameras, and the like.

What is claimed is:

1. A wide angle lens, consisting essentially of a first lens group having a negative refractive power, a second lens group having a positive refractive power, a stop, and a third lens group having a positive refractive power, in order from the object side, wherein:
    the first lens group includes two negative meniscus lenses, each with a convex surface on the object side;
    the second lens group is composed of a cemented lens formed by cementing a positive lens having a biconvex shape and a negative lens with a concave surface on the object side in this order from the object side; and
    the third lens group is composed, in order from the object side, of a cemented lens, a positive lens, an aspherical lens, and a cemented lens formed by cementing a negative lens with a concave surface on the image side and a positive lens having a biconvex shape in this order from the object side.

2. The wide angle lens as claimed in claim 1, wherein the first lens group includes at least one aspherical surface.

3. The wide angle lens as claimed in claim 1, wherein the lenses constituting the first lens group are all negative lenses.

4. The wide angle lens as claimed in claim 1, wherein first lens group is composed of only two or three negative meniscus lenses, each with a convex surface on the object side.

5. The wide angle lens as claimed in claim 1, wherein the wide angle lens satisfies a conditional expression (1) given below:

$$1.3 < f3/f < 2 \quad (1)$$

where
   f3: focal length of the third lens group, and
   f: focal length of the entire system.

6. The wide angle lens as claimed in claim 1, wherein the wide angle lens satisfies a conditional expression (2) given below:

$$0.4 < Y/f3 < 0.9 \quad (2)$$

where
   Y: maximum image height, and
   f3: focal length of the third lens group.

7. The wide angle lens as claimed in claim 1, wherein the wide angle lens satisfies a conditional expression (3) given below:

$$0.8 < BF/f < 1.3 \quad (3)$$

where
   BF: back focus expressed in terms of air equivalent distance, and
   f: focal length of the entire system.

8. The wide angle lens as claimed in claim 1, wherein the most image side cemented lens in the third lens group includes a positive lens and the wide angle lens satisfies a conditional expression (4) given below:

$$75 < v3p \quad (4)$$

where
   v3p: Abbe number of the most image side positive lens included in the most image side cemented lens in the third lens group with respect to the d-line.

9. The wide angle lens as claimed in claim 1, wherein the aspherical lens of the third lens group is a positive lens.

10. The wide angle lens as claimed in claim 1, wherein the wide angle lens is configured to perform focusing from an object at infinity to an object at proximity by moving only the third lens group to the object side.

11. The wide angle lens as claimed in claim 10, wherein the wide angle lens satisfies a conditional expression (5) given below:

$$-0.3 < f/f12 < 0.5 \quad (5)$$

where
   f: focal length of the entire system, and
   f12: combined focal length of the first lens group and the second lens group.

12. The wide angle lens as claimed in claim 1, wherein the wide angle lens has a total angle of view of 80 degrees or more.

13. The wide angle lens as claimed in claim 1, wherein the wide angle lens satisfies a conditional expression (1') given below:

$$1.5 < f3/f < 1.8 \quad (1')$$

where
   f3: focal length of the third lens group, and
   f: focal length of the entire system.

14. The wide angle lens as claimed in claim 1, wherein the wide angle lens satisfies a conditional expression (2') given below:

$$0.5 < Y/f3 < 0.8 \quad (2')$$

where
   Y: maximum image height, and
   f3: focal length of the third lens group.

15. An imaging apparatus equipped with the wide angle lens as claimed in claim 1.

* * * * *